No. 650,199. Patented May 22, 1900.
F. C. SHELLITO.
NUT LOCK.
(Application filed Mar. 2, 1900.)
(No Model.)

WITNESSES:
J. P. Appleman,
V. L. Bogue

INVENTOR
Fred C. Shellito.
BY
H. Evans
ATTORNEYS.

THE NORRIS PETERS CO., PHOTO-LITHO., WASHINGTON, D. C.

UNITED STATES PATENT OFFICE.

FRED C. SHELLITO, OF REMINGTON, PENNSYLVANIA.

NUT-LOCK.

SPECIFICATION forming part of Letters Patent No. 650,199, dated May 22, 1900.

Application filed March 2, 1900. Serial No. 7,063. (No model.)

*To all whom it may concern:*

Be it known that I, FRED C. SHELLITO, a citizen of the United States of America, residing at Remington, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and is particularly adapted for use in connection with railroads, bridges, wagons, vehicles of various kinds, parts of machinery, and for fastening fish-plates to rail-sections of railroads.

One object of the invention is to provide simple and efficient means for locking a nut upon a bolt, so as to prevent it from becoming loosened accidentally, and such object is obtained by providing the screw-threaded portion of a bolt with a series of longitudinal grooves which are adapted to be engaged by a spring-pressed locking-pin arranged in a suitable recess within the nut. The mounting of the nut upon a bolt will cause such engagement of the spring-pressed locking-pin with one of the grooves of the bolt.

A further object of the invention is to construct a nut-lock of this character which will be simple in construction, strong, durable, efficient in its use, and comparatively inexpensive to manufacture.

With the above and other objects in view the invention finally consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1:
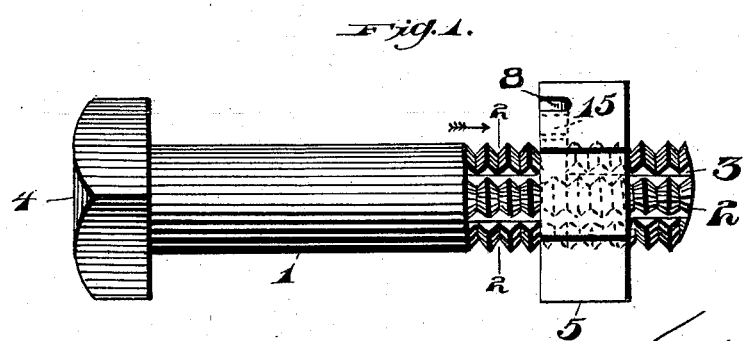
Figure 2:
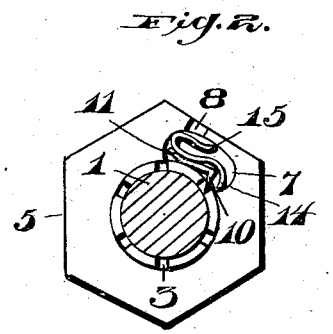
Figure 3:
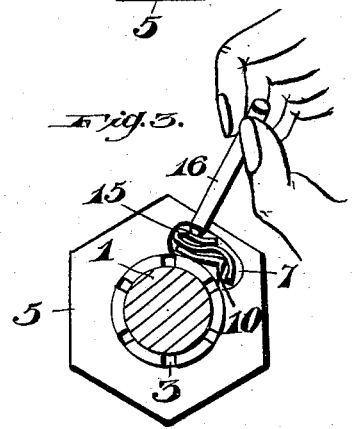
Figure 4:
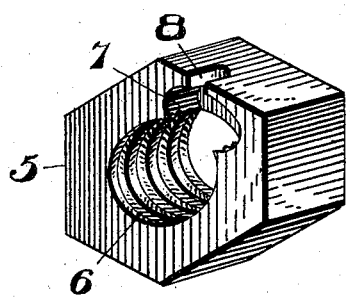
Figure 5:
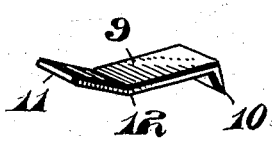
Figure 6:
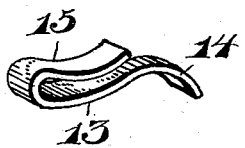

Figure 1 is a side view of my improved nut-lock. Fig. 2 is a cross-sectional view thereof, taken on the line 2 2, Fig. 1, showing the locking-plate in engagement with one of the grooves of the bolt. Fig. 3 is a cross-sectional view thereof, taken on the line 2 2, Fig. 1, showing the locking-plate disengaged from the groove. Fig. 4 is a perspective view of the nut. Fig. 5 is a like view of the locking-plate. Fig. 6 is a perspective view of the spring for keeping the barb of the locking-plate in engagement with one of the grooves of the bolt.

Referring to the drawings by reference-numerals, 1 indicates the cylindrical-shaped bolt, provided with a screw-threaded portion 2, having a series of longitudinal grooves 3 extending therethrough. The bolt is further provided with a head 4.

The reference-numeral 5 indicates a hexagonal-shaped nut provided with a screw-threaded opening 6, registering with a recess 7, formed in the inner face thereof, which terminates into an opening 8, arranged in one side of the nut. Seated within the recess 7 is a locking-plate 9, provided at one end with a downwardly-extending tapering fastening-barb 10 and having its other end bent in an inclined manner in the opposite direction, as at 11, forming a bearing-point 12, which rests upon the bolt when the plate is in position and also permits the rocking of the same, which will be hereinafter described.

The reference-numeral 13 indicates a substantially S-shaped fastening-spring, which is adapted to be seated within the recess 7 and has the leg 14 extending over the barb 10 of the locking-plate 9, as will be seen in Fig. 3, while the opposite leg 15 of the spring 13 frictionally engages the outer wall of the recess 7 for securing the locking-plate in position, as will be seen in Fig. 2.

When the fastening-barb 10 is in engagement with one of the grooves of the bolt, it prevents the nut from being removed therefrom, and when it is desired to remove the nut the rod or pin 16 is inserted through the opening 8 and engages the leg 15 of the spring 13. Pressure being brought to bear upon the rod or pin 16 will compress the leg 15 of spring 13, rocking the locking-plate 9, and remove the fastening-barb from engagement with one of the grooves of the bolt, permitting the removal of the nut. When pressure is removed, the action of the spring will cause the fastening-barb to engage one of the grooves of the bolt.

It is thought that the many advantages of my improved nut-lock can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

In a nut-lock, the combination with the bolt provided in its threaded portion with a series of longitudinally-extending grooves, of a nut mounted upon said bolt and provided with an internal recess 7 registering with the threaded opening of the nut and with a smaller opening 8 provided in the exterior of the nut, a fastening-plate adapted to be arranged within the internal recess of the nut and provided at one end with a downwardly-extending tapered barb and having its other end bent at an incline in the opposite direction to the barb, and a substantially S-shaped spring adapted to be located within the internal recess of the nut on top of the fastening-plate to hold the barb thereof in engagement with one of the grooves of the bolt and its other leg frictionally engaging the wall of the recess, as and for the purpose set forth.

In testimony whereof I affix my signature in the presence of two witnesses.

FRED C. SHELLITO.

Witnesses:
JOHN NOLAND,
E. W. ARTHUR.